United States Patent [19]
Yajima et al.

[11] Patent Number: 5,331,543
[45] Date of Patent: Jul. 19, 1994

[54] BUSINESS MONITORING SYSTEM AND METHOD

[75] Inventors: Hiroshi Yajima, Amagasaki; Sadamichi Mitsumori, Hachioji; Isoji Tabushi, Kamakura; Osamu Akita, Yokohama; Tetsushi Tomizawa, Urawa; Tetsuya Ushio, Yokohama, all of Japan

[73] Assignee: Hitachi, Ltd., Tokyo, Japan

[21] Appl. No.: 642,226

[22] Filed: Jan. 15, 1991

[30] Foreign Application Priority Data

Jan. 19, 1990 [JP] Japan .......................... 2-9977

[51] Int. Cl.$^5$ .................. G06F 15/22; G06F 15/24; G06G 7/52
[52] U.S. Cl. .................................... 364/401; 364/405
[58] Field of Search ............... 395/925, 926; 364/401, 364/405, 406, 408

[56] References Cited

U.S. PATENT DOCUMENTS

| | | | |
|---|---|---|---|
| 4,513,375 | 4/1985 | Bruce | 364/401 |
| 4,774,662 | 9/1988 | Ito et al. | 364/401 |
| 4,799,156 | 1/1989 | Shavit et al. | 364/401 |
| 4,831,526 | 5/1989 | Luchs et al. | 364/401 |
| 4,833,607 | 5/1989 | Dethloff et al. | 364/401 |
| 4,941,090 | 7/1990 | McCarthy | 364/405 |
| 4,941,091 | 7/1990 | Breault et al. | 364/406 |
| 4,992,940 | 2/1991 | Dworkin | 364/401 |
| 5,053,956 | 10/1991 | Donald et al. | 364/401 |
| 5,117,355 | 5/1992 | McCarthy | 364/405 |

FOREIGN PATENT DOCUMENTS

| | | | |
|---|---|---|---|
| 0319838A2 | 6/1989 | European Pat. Off. | |
| 129683 | 8/1983 | Japan | 364/406 |
| 68795 | 4/1985 | Japan | 364/401 |

OTHER PUBLICATIONS

Hitachi Review, vol. 37, No. 1, Feb. 1988, Tokyo, Japan, "The Knowledge-Oriented Hitachi Planning System Generator 'HPGS' Used for Building a Flexible Management/Production Planning System."

Hitachi Review, vol. 37, No. 5, Oct. 1988, Tokyo, Japan, pp. 333-338, "Expert Systems for Distribution Industry" written by Toshiki Ishii, et al.

"Principles of Data Base System", Toshiryo Uemura, Ohm Co., Ltd., pp. 17-48. (Provided in Japanese—English translation unavailable).

Primary Examiner—Roy N. Envall, Jr.
Assistant Examiner—Stephen R. Tkacs
Attorney, Agent, or Firm—Fay, Sharpe, Beall, Fagan, Minnich & McKee

[57] ABSTRACT

A business monitoring system and method having a supervisory work station and a staff work station as well, having a judgment condition storage function having stored therein a condition described for selecting and extracting contents of a business process transaction, having a judgment function for extracting a transaction having contents to be processed on the basis of the condition, and having a transaction-to-mail converting function for converting the transaction to a mail form according to the judgment result before sending it as electronic mail. The system and method allow a supervisor to register his problem concerned in the judgment condition storage function in a computer language suitable for end users or delete or change the already registered problem. The transaction-to-mail converting function allows the electronic mail converted to mail form to be sent to and stored in a mail box for the supervisory work station. The supervisor can then receive a report related to business processes of concern to him in the mailbox at his convenience.

22 Claims, 11 Drawing Sheets

FIG. 6

| 751 | 752 | 753 | 754 | 755 | 756 | 757 |
|---|---|---|---|---|---|---|
| SENDER CODE | BUSINESS PROCESS KIND CODE | GOODS CODE | NUMBER CODE | CODE OF CUSTOMER TO SUPPLY | CODE FOR THE PROCESS RESULT | CONDITION JUDGING CODE |

BUSINESS MONITORING SYSTEM AND METHOD

BACKGROUND OF THE INVENTION

1. Field of the Invention

The present invention relates to a business monitoring system and method, and more particularly concerns a business monitoring system and method suitable for a supervisor to automatically obtain necessary information without interrupting staff or a section in charge of performing business process, and further deals with a business monitoring and supporting system and method thereof.

2. Description of the Prior Art

In order for a supervisor of an organization to make a decision, he has to obtain results of business processes made by his related staff and make a judgment on the basis of the information. For the purpose, this supervisor desires to properly and conveniently obtain information such as, for example, contents of transactions and the order situation of specific goods.

On the other hand, a staff member who has to provide the information lowers his efficiency when he reports his own business process to his supervisor. In a conventional manner, therefore, the supervisor directs items to be reported to the staff aurally or in writing, and the staff reports to the supervisor only the specific business process in that regard.

Recently, computers have been increasingly used for data base in which the information acquired by staff members can be related to one another and stored. Principles of the data base is described in the "Principles of Data Base System", pp 17–48, Toshiryo Uemura, Ohm Co., Ltd.

FIG. 10 shows a block diagram for a business monitoring and supporting system configured on the basis of the typical data base. It comprises a basic information system 1000 for performing a variety of businesses, a communication controller 1100 for controlling communication between the basic information system 1000 and external workstations, a data base manager 1200 for operating a data base system, a basic data base 2000 for storing business results, a staff work station 3000 to be used by staff members in business, and a communication line 5000 for connecting the basic information system 1000 with the external work station.

In the prior art, a transaction transmitted through the communication line 5000 from the staff work station 3000 is processed through the communication controller 1100 in the basic information system 1000 and sent to the data base manager 1200. The data base manager 1200 accesses the basic data base 2000 for a result. The result is returned from the communication controller 1100 back to the staff work station 3000.

The system shown in FIG. 10 has a transaction input from the staff work station 3000 and processed in the data base manager 1200. The processed result is returned back to the staff work station 3000 as in the prior art.

FIG. 11 shows a block diagram for an example of prior business monitoring and supporting system built up on the basis of the system in FIG. 10. This example is a system that allows for message processes related to orders from sales shops.

The prior system comprises a basic information system 1 for processing data of a variety of businesses, a staff system 2 used for business processes by staff, another party's system 4 which is an inventory control system of another company, an inventory retrieving apparatus 12 for checking goods for presence, an inventory data base 13 (hereinafter referred to as the "inventory DB") for storing inventory information, communication controller 18 for controlling communication with external systems, another party's basic control system 41 for business processing with use of other party's system, inventory retrieving apparatus 42 for checking goods for presence with use of the other party's system, an inventory data base 43 (hereinafter referred to as the "other party's inventory DB") for storing inventory information related to the other party, a controller 67 for controlling the inventory retrieving apparatus 12, the communication controller 18, and similar units, a communication line 61 for connecting the basic information system 1 with the external system, and a staff system terminal 29 to be operated by the staff.

The basic information system 1 and the staff system 2 are included in an organization, for example, a company, and the other party's system 4 is in another organization, for example, another company.

The staff can issue a transaction for requesting inventory retrieval from the staff system terminal 29 to time basic information system 1. The communication controller 18 of the basic information system 1 can receive the transaction. The controller 67 sends it to the inventory retrieving apparatus 12. The inventory retrieving apparatus 12 retrieves the inventory data base 13 to check goods required for presence. The controller 67 sends the results to the communication controller 18.

If the requested goods are stocked, the controller 67 returns confirmation of the presence of goods through the communication controller 18 and at the same time, sends a transaction to the staff system 2 asking for confirmation whether the goods are to be provided.

In the prior example, when an inquiry from a sales shop is to be processed, the flow of business processes such as provision for inventory and order of goods to a manufacturer for no provisions is partly automated with respect to inventory control, for example. The remaining processes are decided by staff in a head office of a sales company.

The prior art achieves all information control with use of the data base system as shown in FIG. 11 as a business monitoring and supporting system.

However, in FIG. 11, the following case may occur as an example. If goods are not stocked, it may be desirable that the goods already reserved by another user be delivered to an important customer on a date he desires. Such a decision is usually made by a supervisor of the staff in charge or an executive of the company if the order is important. It is therefore desirable that the supervisor conceive all the contents of processes of the staff so that he can make the decision. This however is difficult. It is also not possible for the supervisor and executive, who are generally busy, to check such a task even if their business is interrupted at the time of occurrence of a business process transaction.

There is the following problem specific to inquiry business. A need for shorter delivery has increased in recent years. To satisfy this need, inventory retrieval should be made at a high speed in a method, for example, where a sales man can inquire in real time to the inventory DB of the head office and those of other related companies, such as manufacturers and sales companies, as well. This method involves an organizational problem. The other companies strictly control their inventories. It is the problem of security when the inventories are retrieved or reserved for order by people of other companies. Further, there may be cases where good sellers should be provided with future orders from the company's customers without distributing to other companies, even if they are stocked and not reserved.

For these reasons, problems are caused in the method when direct retrieval of the other company's DB is made, or a transaction is issued to the other company's DB even if it is made by subsidiary companies Items desired to be reported from the staff to the supervisor may vary with a change of business situation, for example, when a new noticeable product is announced. In that event, the supervisor has a heavy burden as he has to account for the changes among a number of staff members whenever the change happens.

Also, the staff generally cannot understand the intention of the supervisor depending on the contents of a direction. As a result, no report may be given to the supervisor, or wrong reports may be prepared for him. These prevent the supervisor from proceeding with his work.

SUMMARY OF THE INVENTION

In view of the foregoing, it is a general object of the present invention to provide a business monitoring system and method that can solve the problems of the prior art and can efficiently collect exact information, and further provide a business monitoring and supporting system and method of using it.

In order to achieve the object mentioned above, foregoing objects are accomplished in accordance with aspects of the present invention by the business monitoring system in a business process system having a staff work station, a basic information system for processing a business process request received from the staff work station, and a communication line between the basic information system and the staff work station. The present invention includes sending a transaction related to the business process request from the staff work station to the basic information system and extracting a transaction having contents to be processed from the transactions related to the business process request sent from the staff work station on the basis of the condition described in the judgment conditions storage means in advance. It also is possible to make transaction-to-mail conversion in which the transaction is converted to a mail form, or electronic mail format, depending on the condition of extraction before sending it as electronic mail.

The business monitoring system and the business monitoring and supporting system using it have the following further features:

(1) They have a judgment condition storage section having stored therein a condition for selecting contents of a business process transaction entered from a staff work station, and have a judgment section for selecting the transaction having the contents to be processed on the basis of the condition described in the judgment condition storage section.

(2) They also have a transaction-to-mail conversion section in which a response to the business process described in a transaction form is converted to a mail form depending on the condition of extraction before sending it as electronic mail.

(3) The business monitoring systems described in features (1) and (2) are added to the business process system described in feature (1) and (2).

(4) In the business monitoring and supporting system described in feature (3), the business monitoring system having the transaction-to-mail converting apparatus is connected to a supervisory work station having a mail storage apparatus for storing mail received through a communication line, and sends the electronic mail converted by the transaction-to-mail converting apparatus to the supervisory work station.

(5) In the business monitoring and supporting system described in feature (4), the business monitoring system has the condition judgment apparatus and converts the business transaction selected and extracted by the condition judgment apparatus to mail, using the transaction-to-mail conversion apparatus, and sends it to the supervisory work station which stores the sent mail in the mail storage apparatus.

(6) In the business monitoring and supporting system described in feature (5), the business monitoring system makes the condition judgment apparatus and the transaction-to-mail conversion apparatus process the results for which the basic information system processed the business process request from the staff work station.

(7) In the business monitoring and supporting system described in feature (5), the business monitoring system makes the condition judgment apparatus and the transaction-to-mail conversion apparatus process the transaction entered from the staff work station before the basic information system processes the business process request of the transaction.

(8) In the business monitoring and supporting system described in feature (7), the business monitoring system prevents the basic information system from making the business process for the transaction that is improper, i.e., does not satisfy the conditions, for the condition judgment apparatus.

(9) In the business monitoring and supporting system described in feature (6) or (7), the business monitoring system has a mail judgment condition storage apparatus having a condition described for judging whether the electronic mail received outside through the communication line is a desired process content or not, and has a received mail classifier for classifying the received electronic mail on the basis of a judging condition described in the mail judgment condition storage apparatus, and has an electronic mail classifying and storage apparatus for extracting the electronic mail classified by the received mail classifier.

(10) In the business monitoring and supporting system described in feature (9), the business monitoring system has a mail-to-transaction converting apparatus for converting the business process contents of the electronic mail received outside to a transaction form before sending it.

(11) In the business monitoring and supporting system described in feature (10), the business monitoring system makes the mail-to-transaction converting apparatus convert the contents of the electronic mail classified and extracted by the electronic classifying and storage apparatus to a transaction, and makes the basic information system process the transaction.

(12) In the business monitoring and supporting system described in feature (5), the business monitoring system allows the basic information system to return the results of a transaction process to the staff work station and in parallel, allows the operation of the condition judgment apparatus and the transaction-to-mail converting apparatus.

(13) In the business monitoring and supporting system described in feature (5), the business monitoring system allows the basic information system to process the transaction sent from the staff work station and in parallel, allows the operation of the condition judgment apparatus and the transaction-to-mail converting apparatus.

(14) In the business monitoring and supporting system described in feature (10), the business monitoring system has the contents of the electronic mail extracted by the electronic mail classifying and storage apparatus added with the judgment condition described in the mail judgment condition storage apparatus before sending them to the supervisory work station.

(15) In the business monitoring and supporting system described in feature (10), the business monitoring system has a selection and judgment apparatus having a judgment condition described for selecting a process method of the electronic mail extracted by the electronic mail classifying and storage apparatus, and makes the process described either in feature (11) or (14) on the basis of the judgment condition described in the selection and judgment apparatus.

OPERATION

In the present invention, a staff member can operate the staff work station to conduct the business process in his charge. He can issue a process request transaction to the basic information system as necessary. He can receive a process response for the issued transaction from the basic information system before conducting a business process. These operations can be usually accomplished under an online real time operation.

The supervisor in this system, depending on a change of situation, can register in a computer language suitable for end users his own problem concerned with the judgment condition intelligent base provided in the business monitoring system using his supervisory work station, or delete or change a problem registered already. This allows him to freely set the contents a report request.

The response for the transaction from the staff from the basic information system to the staff work station can be checked by the condition judgment apparatus. It can be automatically made to extract a transaction process which meets the condition registered in the condition judgment apparatus and which conforms to the problem concerned with the supervisor.

Contents of the transaction can be sent to the transaction-to-mail converting apparatus provided in the business monitoring system before being converted to a mail form. The electronic mail generated can be sent to the mail box for the supervisory work station before being stored therein.

The business processed contents that conform to the problem concerned with the supervisor can be automatically collected in the mail box for the supervisor. He can receive the report items related to staff's business process from the mail box for the supervisory work station at any time of his convenience.

On the other hand, when the system receives electronic mail from the outside, the received mail classifying apparatus can read the contents of the received electronic mail, and can classify the received electronic mail having the process contents desired by the supervisor using the judgment condition in the mail judgment condition storage apparatus.

The selection and judgment apparatus can convert to a transaction the contents of the electronic mail extracted by the electronic mail classifying and storage apparatus on the basis of the supervisor's judgment condition. It then can select whether the basic information system is to process the transaction, or to send it to the supervisory work station with the supervisor's judgment condition added to it, or to send it to the staff work station.

For the latter case, the received electronic mail can be stored in the mail box for the supervisory work station or in the mail box for the staff work station. For the former case, the mail converting apparatus can convert to transaction process the business process contents of the received electronic mail, and the basic information system can do the transaction process.

The foregoing and other objects, advantages, manner of operation and novel features of the present invention will be understood from the following detailed description when read in connection with the accompanying drawings.

BRIEF DESCRIPTION OF THE DRAWINGS

Other objects and advantages of the present invention will further become apparent thereinafter and in the drawings in which:

FIG. 6 is a format of the transaction message stored in the transaction contents memory 162 shown in FIG. 4.

DETAILED DESCRIPTION OF EMBODIMENTS

Figure 1:
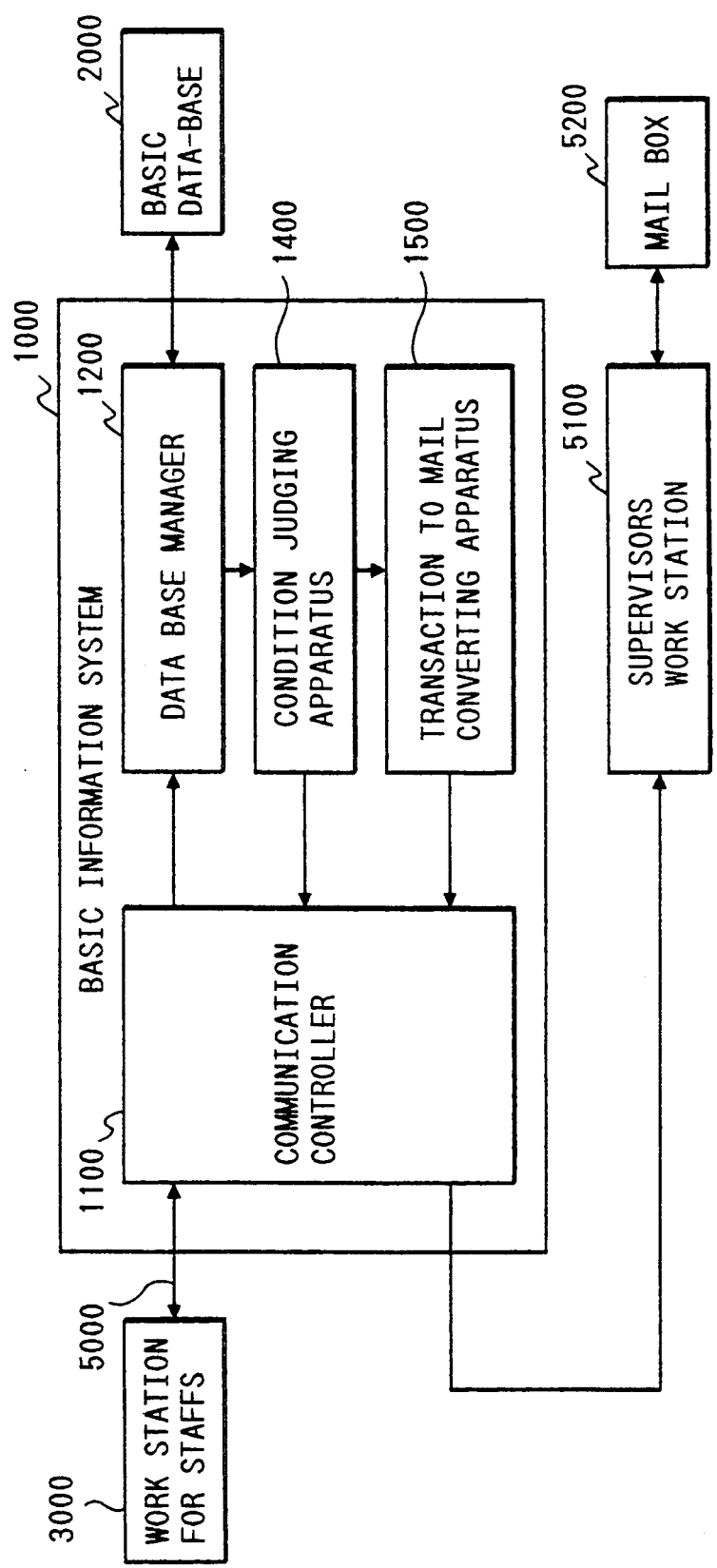
FIG. 1 is a block diagram illustrating a first embodiment of a business monitoring system according to the present invention.

For the purpose of illustration only, the present invention will now be illustrated by the following embodiments. Of course, the present invention shall not be limited to the following embodiments.

In describing the preferred embodiment of the present invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose. For example, "workstation" can be interpreted in a broad sense such as "an information processing terminal in general" or in any manner well known among those skilled in the art.

FIG. 1 is a block diagram illustrating a first embodiment of a business monitoring system according to the present invention. It comprises a basic information system 1000 for performing a variety of business, a communication controller 1100 for controlling communication between the basic information system 1000 and external workstations, a data base manager 1200 for operating a data base system, a staff work station 3000 to be used by staff in business, a basic data base 2000 for storing business results, a supervisory level work station 5100 which is a higher work station connected through the communication controller 1100 to the basic information system 1000, and a mail box 5200 connected to the supervisory work station 5100. In an existing data base system such as a public or leased communication line 5000, the basic information system 1000 has a condition judging apparatus 1400 and a transaction-to-mail converting apparatus 1500 therein as business monitoring units to achieve the present invention.

In the prior art, a transaction given through the communication line 5000 from the staff work station 3000 is processed through the communication controller 1100 in the basic information system 1000 and sent to the data base manager 1200. The data base manager 1200 retrieves the basic data base 2000 for a result. The result is returned from the communication controller 1100 back to the staff work station 3000.

The system shown in FIG. 1, like the prior art, has a transaction input from the staff work station 3000 and processed in the data base manager 1200. A result obtained is determined as to whether contents of the transaction can be accepted by a supervisor judge condition stored in the condition judging apparatus 1400. If acceptable, the contents and judge condition are sent to the transaction-to-mail converting apparatus 1500. At the same time, the processed result is returned back to the staff work station 3000 as in prior art.

The transaction-to-mail converting apparatus 1500 composes mail sentences which have the same contents as those of the transaction. The main sentences are stored in the mail box 5200 for the supervisory work station 5100 through the communication controller 1100.

A supervisor can look into the mail box 5200 from the supervisory work station 5100 at his convenience to review a transaction processed by a staff which is concerned with his jobs.

According to the first embodiment mentioned above, the supervisor can automatically recognize the transaction process concerned with his jobs without giving any special direction to the staff. The staff cannot be interrupted by the supervisor during his task. The supervisor can receive at his convenience a report of the transaction processes made by the staff.

The embodiment is configured so that process can be implemented in series between the condition judging apparatus 1400 and the data base manager 1200. It may be made in parallel by them.

The embodiment also is arranged in a configuration so that the business monitoring and supporting unit is provided in the basic information system 1000. It may be provided independently from the basic information system 1000.

Figure 2:
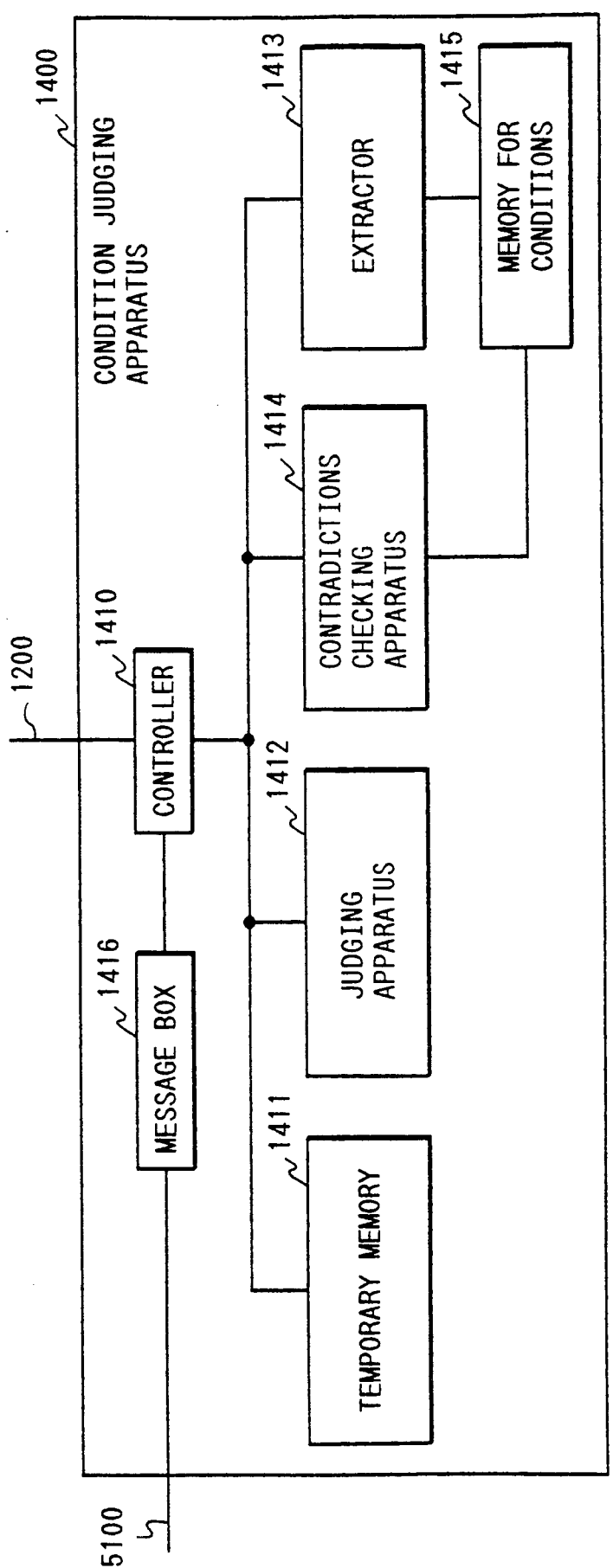
FIG. 2 is block diagram illustrating an internal configuration of the condition judging apparatus 1400 given in FIG. 1.

FIG. 2 is block diagram illustrating an internal configuration of the condition judging apparatus 1400 given in FIG. 1. The condition judging apparatus 1400 comprises a controller 1410 for controlling a condition judging operation, a temporary memory 1411 for temporarily storing the transaction and its processed contents, a judging apparatus 1412 for judging the transaction on the basis of judging conditions, an extractor 1413 for extracting the judging conditions, a contradiction checking apparatus 1414 for correcting the judging conditions, a condition memory 1415 for storing the judging conditions, and a message box 1416 for storing a condition changing message given from the supervisory work station 5100. The condition judging apparatus 1400 is connected to the data base manager 1200 and the supervisory work station 5100 as shown in FIG. 1.

The controller 1410 can receive the transaction and its processed contents to store them into the temporary memory 1411. After this, it sends a signal to the extractor 1413.

The extractor 1413, when receiving the signal, can take out one judging condition in sequence out of the condition memory 1415 and sends it to the judging apparatus 1412.

The judging apparatus 1412 determines whether the given judging condition can come into existence. If so, it sends the contents and judging condition in the temporary memory 1411 to the transaction-to-mail converting apparatus 1500. If not, the judging apparatus 1412 determines whether all the judging conditions have been taken out or not. If there are still remaining judging conditions, it sends the signal to the extractor 1413 to repeat the same operation.

If all the judging conditions are already taken out, the extractor 1413 send a signal to the controller 1410. The controller 1410, when receiving the signal, sends the contents of the temporary memory 1411 to the communication controller 1100 shown in FIG. 1.

In the way described above, the information required by the supervisor has been sent to the supervisory work station 5100 shown in FIG. 1.

In turn, the following describes the operation due to the change of the judging condition in the condition judging apparatus 1400. When the judging condition to be stored in the condition memory 1415 is changed, a change message is sent out from the supervisory work station 5100 shown in FIG. 1. The message is stored in the message box 1416. The controller 1410 reads the message box 1416 at certain intervals. If the message is stored, it checks that the temporary memory 1411 has no contents before storing the message into the temporary memory 1411. At the same time, it sends a signal to the contradiction checking apparatus 1414.

The contradiction checking apparatus 1414, when receiving the signal, reads the temporary memory 1411 to determine the changed contents, reads and correct the judging condition corresponding to it from condition memory 1415, and stores it into time condition memory 1415 again. If the change is to add a condition, the contradiction checking apparatus 1414 merely stores it into the condition memory 1415. If the change is to delete the condition, it rewrites the condition memory 1415.

The first embodiment described above is configured so that the judging condition can be automatically changed. It may be arranged so that the supervisor can take the contents of condition memory 1415 into the supervisory work station 5100, can correct the judging condition by itself, and can resend it to the condition memory 1415.

Figure 3:
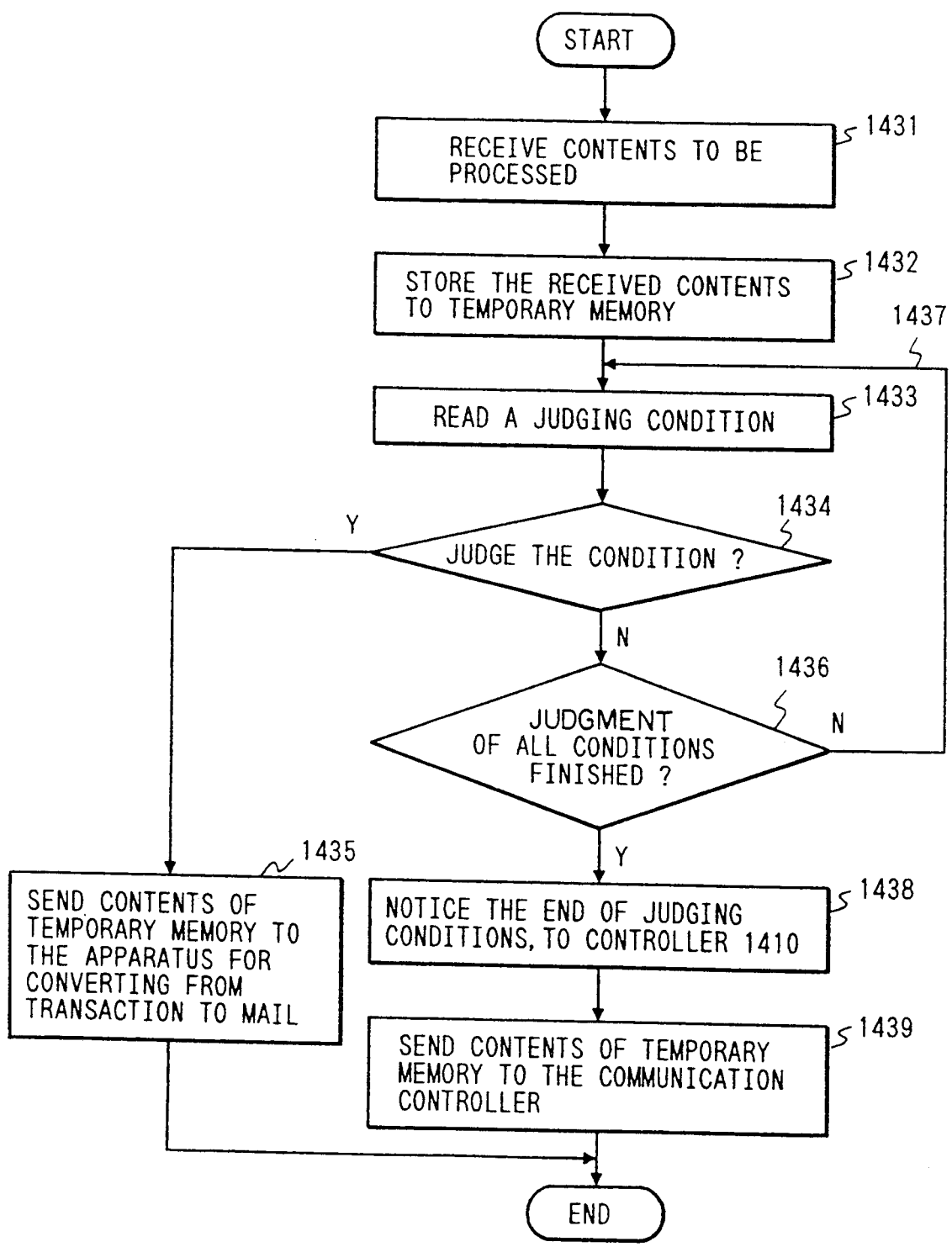
FIG. 3 is a flow chart showing a process operation of the condition judgment apparatus in FIG. 2.

FIG. 3 is a flow chart showing a process operation the condition judgment apparatus in FIG. 2.

The controller 1410, when receiving the transaction and its processed contents (step 1431), stores it into the temporary memory 1411 (step 1432), and sends a signal to the extractor 1413. The extractor 1413, when receiving the signal, can take out one judging condition in sequence out of the condition memory 1415 and sends it to the judging apparatus 1412 (step 1433).

The judging apparatus 1412 determines depending on the given judging condition and the contents in the temporary memory 1411 as to whether the judging condition can come into existence (step 1434). If so, it sends the contents in the temporary memory 1411 and the judging condition to the transaction-to-mail converting apparatus 1500 (step 1435) and ends the process. If not in step 1434, the judging apparatus 1412 determines whether all the judging conditions have been taken out or not (step 1436). If there are still remaining judging conditions, it sends the signal to the extractor 1413 to repeat the same operation (step 1437).

If all the judging conditions are already taken out, the extractor 1413 sends a signal to the controller 1410 (step 1438). The controller 1410, when receiving the signal, sends the contents of the temporary memory 1411 to the communication controller 1100 shown in FIG. 1 (step 1439). This ends the process.

Figure 4:
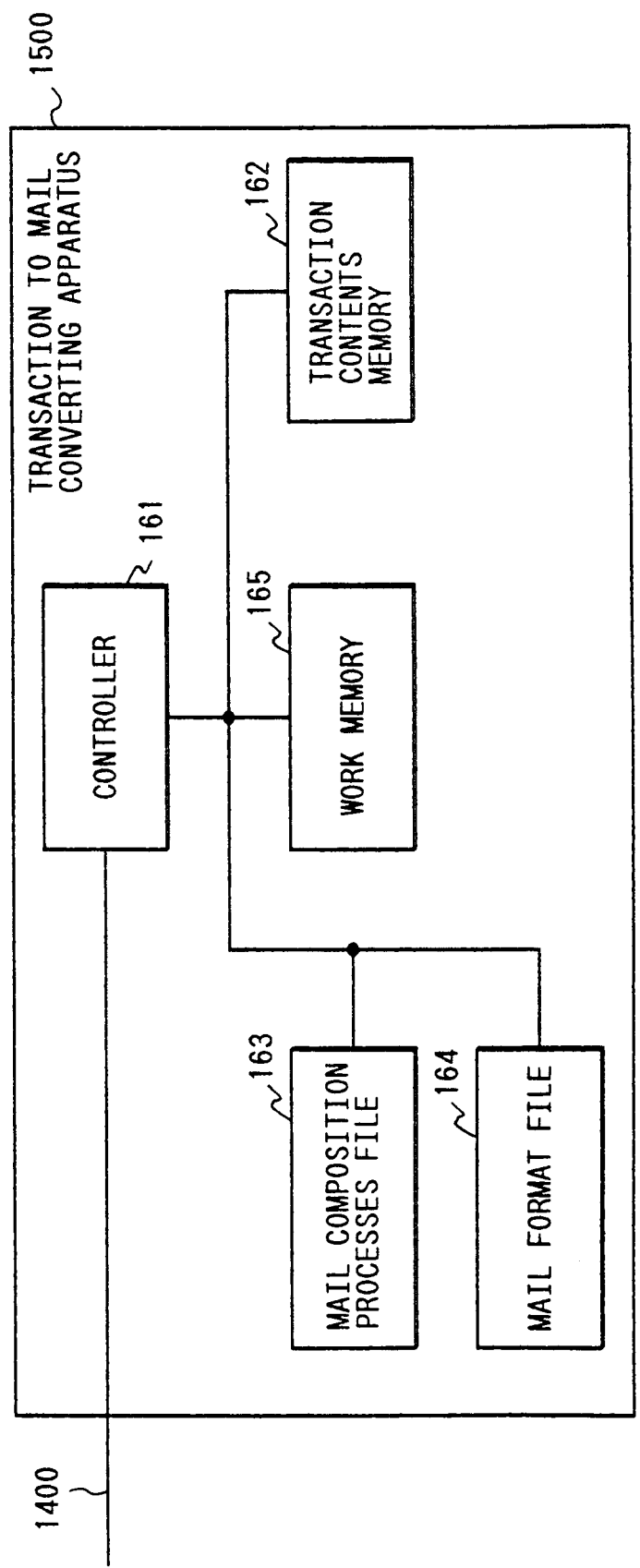
FIG. 4 is a block diagram illustrating an embodiment of the transaction-to-mail converting apparatus 1500 shown in FIG. 1.

FIG. 4 is a block diagram illustrating an embodiment of the transaction-to-mail converting apparatus 1500 shown in FIG. 1. The transaction-to-mail converting apparatus 1500 comprises a controller 161 for controlling its operation, a transaction contents memory 162 for storing the judging condition, a mail composition process file 163 laving mail composition processes, a mail format file 164 having a mail format, and work memory 165 for storing the mail format. The transaction-to-mail converting apparatus 1500 is connected to the condition judging apparatus 1400 shown in FIG. 2.

The controller 161, when receiving the transaction, its processed contents, and checked judging condition from the condition judging apparatus 1400 shown in FIG. 1, stores them in the transaction contents memory 162 once. The controller 161 also reads the mail composition process file 163, and reads from the mail format file 164 a corresponding mail format according to mail composition processes corresponding to a business process kinds code 752 which will be described in FIG. 6, and stores it into work memory 165. The controller 161, in turn, copies the contents of the transaction contents memory 162 to corresponding areas of the work memory 165 in sequence according to the mail composition processes. After copying, the controller 161 sends the contents of the work memory 165 to the supervisory work station 5100 through the communication controller 1100 shown in FIG. 1.

Figure 5:
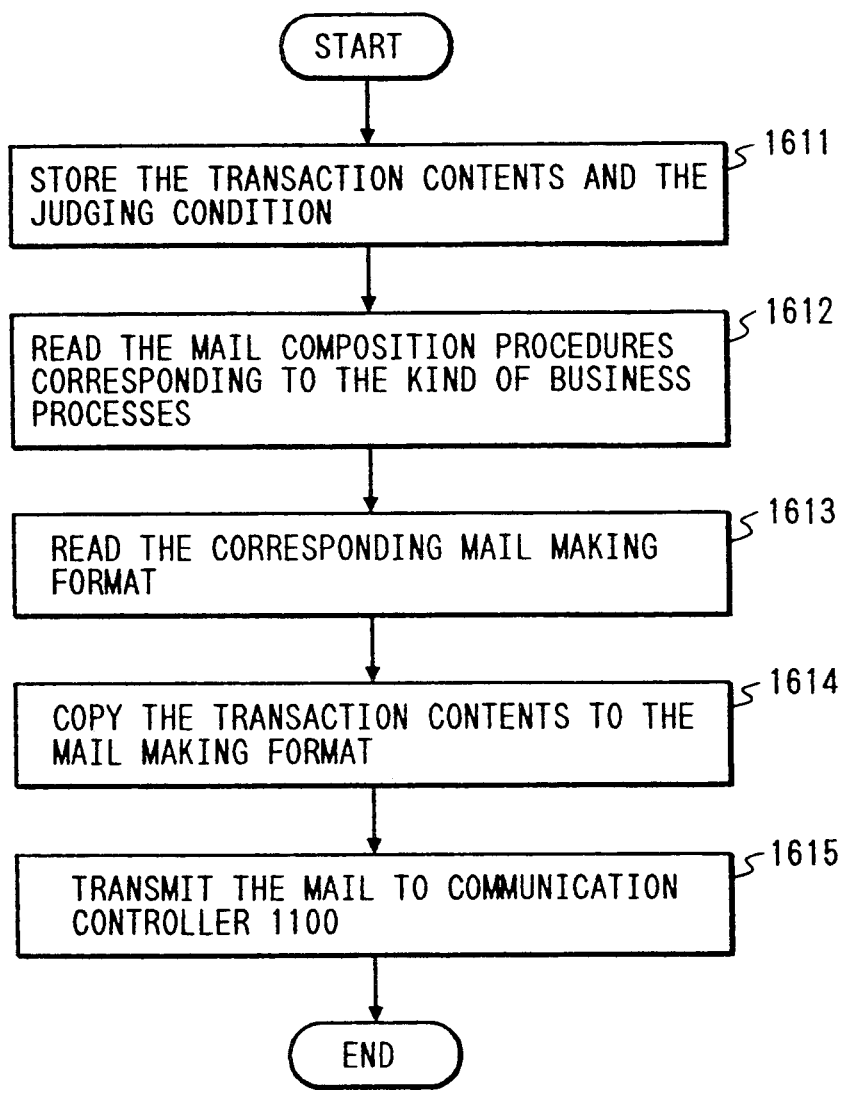
FIG. 5 is a flow chart showing a process operation of the transaction-to-mail converting apparatus 1500 shown in FIG. 4.

FIG. 5 is a flow chart showing a process operation of the transaction-to-mail converting apparatus 1500 shown in FIG. 4. First it receives the transaction contents and the judging condition from the condition judging apparatus 1400 shown in FIG. 1 and stores them (step 1611). It, then, reads the mail composition processes corresponding to the kind of business processes from the mail composition process file 163 (step 1612). According to the mail composition processes, it reads a corresponding mail making format from the mail format file 164 (step 1613) and stores it into the work memory 165. Similarly, according to the mail composition processes, it copies the transaction contents to the mail making format (step 1614) and transmits the mail to the communication controller 1100 shown in FIG. 1.

FIG. 6 is a format of the transaction message stored in the transaction contents memory 162 shown in FIG. 4. The format is formed of seven attribute codes, including a sender code 751 for indicating a staff member in charge of entering information, a business process kinds code 752 for indicating a kind of business process, a goods code 753 for indicating a kind of goods treated in the business process monitoring, a number code 754 for indicating a quantity of the goods to supply, a customer supply code 755 for indicating a customer, a process results code 756 for indicating a process result corresponding to an entered judging condition, and judging condition 757 for indicating a kind of the entered judging condition.

The format mentioned above is used for the transaction message having the transaction, its processed contents, a judging condition to check it, etc. from the condition judging apparatus 1400 shown in FIG. 1. The format is stored in the transaction contents memory 162 shown in FIG. 4.

Figure 7:
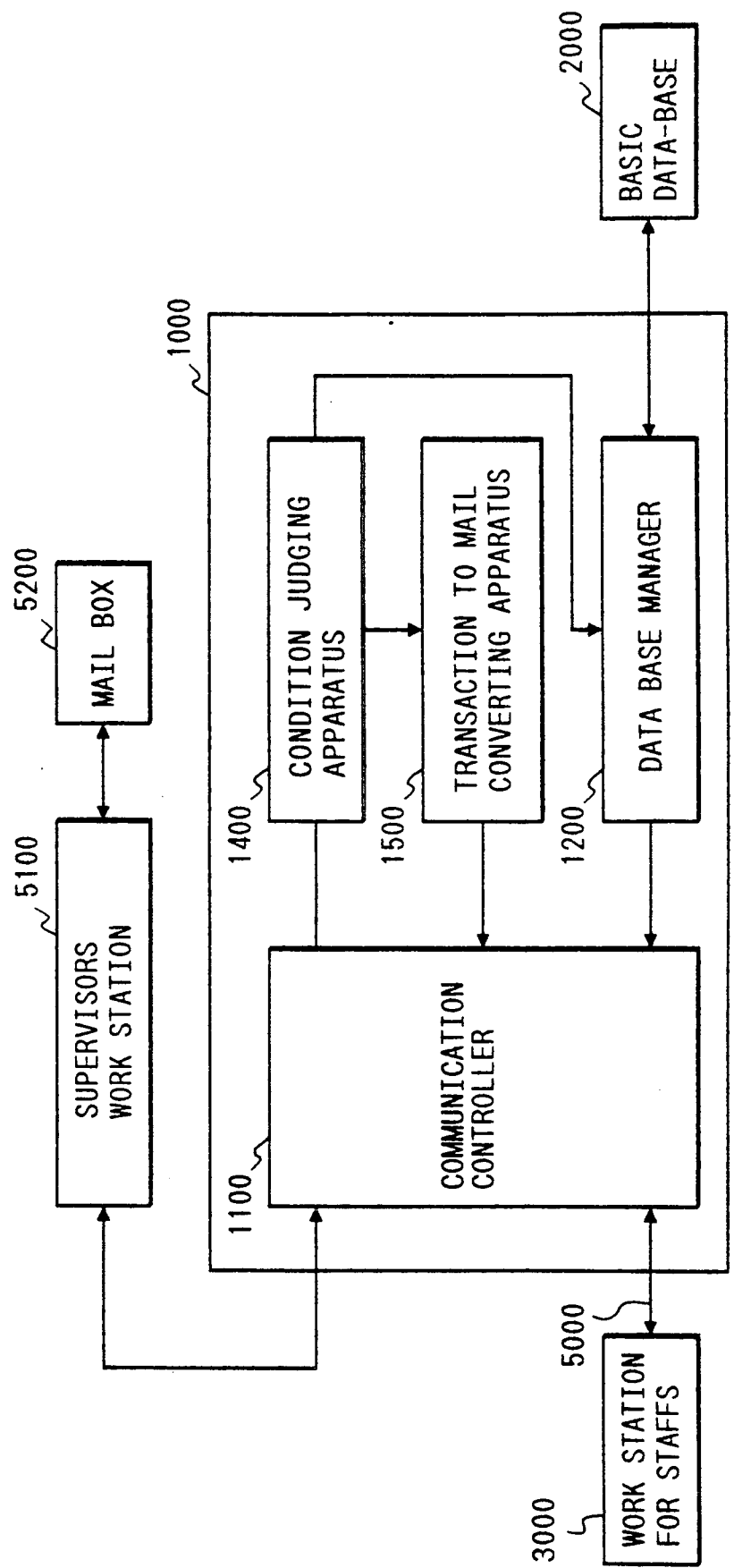
FIG. 7 is a block diagram illustrating a second embodiment of the business monitoring system according to the present invention.

FIG. 7 is a block diagram illustrating a second embodiment of the business monitoring system according to the present invention. A configuration of the second embodiment is Identical with that of the first embodiment. That is, it comprises a basic information system 1000 for performing a variety of businesses, a communication controller 1100 for controlling communication between the basic information system 1000 and external workstations, a data base manager 1200 for operating a data base system, a basic data base 2000 for storing business results, a staff work station 3000 to be used by staff member in business, a supervisory work station 5100 which is a higher level work station connected through the communication controller 1100 to the basic information system 1000, and a mail box 5200 connected to the supervisory work station 5100. In an existing data base system, there is a communication line 5000 for connecting the basic information system 1000 and an external apparatus, and the basic information system 1000 has a condition judging apparatus 1400 and a transaction-to-mail converting apparatus 1500 therein as business monitoring units to achieve the present invention.

The transaction entered by the staff work station 3000 is received by the communication controller 1100, and is sent to the condition judging apparatus 1400. This determines whether contents of the transaction can be accepted by a supervisor judge condition stored in the condition judging apparatus 1400. If acceptable, the contents and judge condition are sent to the transaction-to-mail converting apparatus 1500. At the same time, the condition judging apparatus 1400 sends the transaction to the data base manager 1200. The transaction is processed in the data base manager 1200 and is returned to the staff work station 3000 as in usual data base system.

If the process of the transaction is determined unacceptable, a transaction called the "supervisor stop", an order from the supervisor station to stop the transaction, is sent to the staff work station 3000 through the communication controller 1100.

The transaction-to-mail converting apparatus 1500 can convert the contents of the processed and sent transaction to mail. The mail is stored in the mail box 5200 for the supervisory work station 5100 through the communication controller 1100.

In the second embodiment, the supervisor cannot only conceive the transaction fit to his problem concerned without any special direction to the staff, but also can prevent it from being processed in an arbitrary way. The staff cannot be interrupted by the supervisor during his task. He also can have an indication from the supervisor that his process is wrong at the time of execution.

The embodiment is configured so that process can be made in series between the condition judging apparatus 1400 and the data base manager 1200. It may be made in parallel by them.

Figure 8:
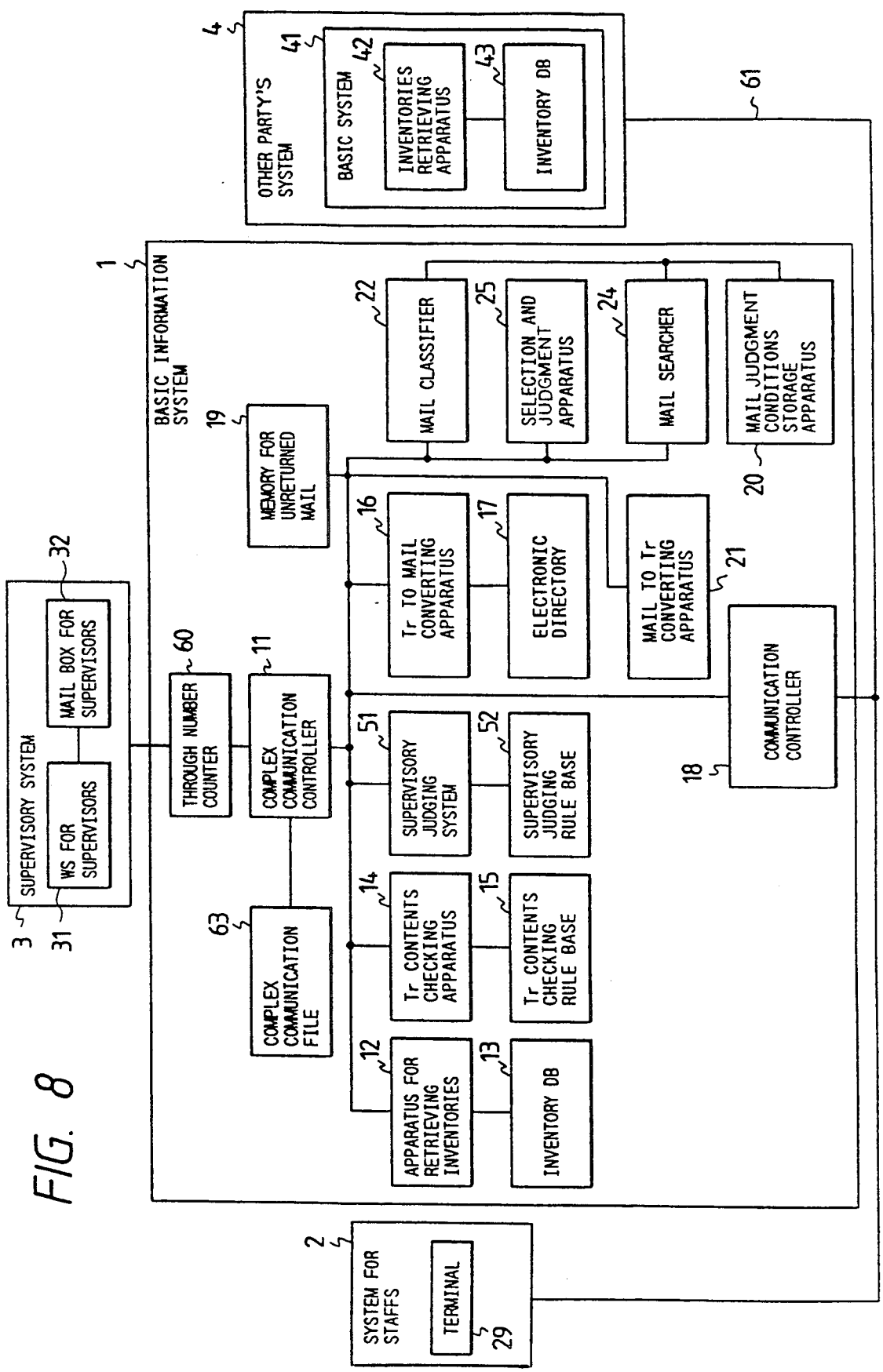
FIG. 8 is a block diagram illustrating a third embodiment of the business monitoring system according to the present invention.
Figure 11:
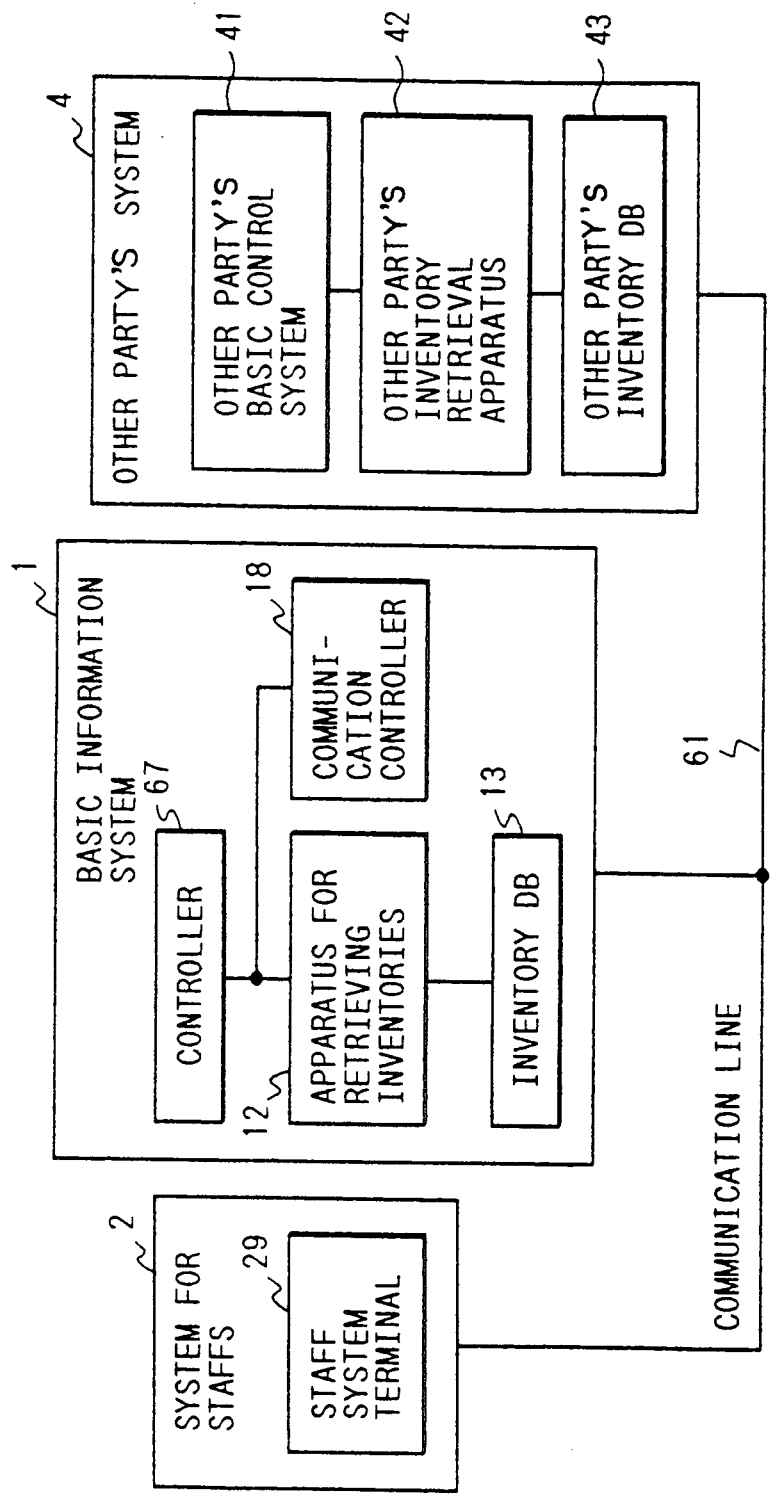
FIG. 11 shows a block diagram for an example of prior business monitoring and supporting system built up on the basis of the system in FIG. 10.

FIG. 8 is a block diagram illustrating a third embodiment of the business monitoring system according to the present invention. The embodiment is an improved business monitoring system and method in time inventory control system which was described in FIG. 11 as an example of prior art. It is suitable for processing inquiry messages from sales shops during order processes.

It comprises a prior system and a supervisory system 3. The prior system comprises a basic information system 1 for processing a variety of businesses, a staff system 2 used for business process by staff, another party's system 4 which is an inventory control system of another company, an inventory retrieving apparatus 12 for checking goods for presence, an inventory data base 13 (hereinafter referred to as the "inventory DB") for storing inventory information, communication controller 18 for controlling communication with external systems, another party's basic control system 41 for business processing with use of other party's system, inventory retrieving apparatus 42 for checking goods for presence with use of the other party's system, a inventory data base 43 (hereinafter referred to as the "other party's inventory DB") for storing inventory information in the other party, a communication line 61 connected to the external system, a staff system terminal 29 to be operated by the staff. The supervisory system 3 comprises a supervisory work station 31 which is a higher level work station and a supervisory mail box 32.

Further, the basic information system 1 has additional apparatuses and units, including a complex communication controller 11 for giving a through number to the transaction and for sending it to other apparatuses, a transaction contents checking apparatus 14 for judging contents of the transaction, a transaction contents checking rule base 15 having conditions stored for judging the transaction contents, a transaction-to-mail converting apparatus 16 for converting the transaction contents and through number to a mail message, a electronic directory 17 having mail addresses stored for respective businesses, an unreturned mail memory 19 for storing through numbers of the mail determined in addresses to send for the respective businesses, a mail judgment condition storage apparatus 20 having conditions stored for judging whether contents of the mails are to be necessarily processed, a mail-to-transaction converting apparatus 21 for converting the mail contents to transaction process message, a mail classifier 22 for judging whether the mail should be processed depending on its contents, a mail searcher 24 for giving the judging condition to the mail contents, a selection and judgment apparatus 25 for determining a process method for the mail on the basis of the supervisor selection condition in the mail judgment condition storage apparatus 20, a supervisory judging system 51 for judging whether the transaction contents conform to the supervisor judging rule, a supervisory judging rule base 52 having the supervisor judging rule stored therein, a through number counter 60 for issuing through numbers for controlling the transactions received by the basic information system 1, and a complex communication file 63 for storing the through numbers given to the mails.

The staff can issue a transaction for requesting inventory retrieval from the staff system terminal 29 to the basic information system 1. The communication controller 18 of the basic information system 1 can receive the transaction and send it to the complex communication controller 11. The complex communication controller 11 can send a signal to the through number counter 60. The through number counter 60 having the signal received reads contents from its memory, adds '1' to them, and outputs the sum to the complex communication controller 11. At the same time, it stores the sum into the memory. The complex communication controller 11 also gives a through number obtained through the through number counter 60 to the transaction, and sends it to the inventory retrieving apparatus 12. At the same time, the complex communication controller 11 sends the transaction having the same through number to the supervisory judging system 51.

The supervisory judging system 51 can judge by way of reading the supervisory judging rule base 52 whether the transaction contents conform to the supervisor judging rule. If so, it sends the transaction to the complex communication controller 11. The complex communication controller 11 sends the transaction contents to the transaction-to-mail converting apparatus 16 to convert them to mail. The complex communication controller 11 also gives the same through number to the transaction, and sends it to the supervisory mail box 32 of the supervisory system 3. At the same time, it stores the through number into the complex communication file 63.

The inventory retrieving apparatus 12 accesses the inventory data base 13 to check the requested goods for presence, and sends the result to the complex communication controller 11 with the same through number as the transaction.

The complex communication controller 11 checks the complex communication file 63 for presence of the through number. If so, it converts the retrieved result to mail using the transaction-to-mail converting apparatus 16, and sends it to the supervisory mail box 32 with the same through number as stored.

If there is found the requested goods as retrieved by the inventory retrieving apparatus 12, the complex communication controller 11 returns confirmation of the presence of goods and at the same time, sends a transaction to the staff system 2 asking for confirmation whether the goods are to be provided.

If there are no goods, or if the transaction process generated by the staff system 2 in the organization cannot end in the organization (the inventory retrieving apparatus 12 here), the complex communication controller 11 sends the transaction to the transaction contents checking apparatus 14 with it having the same through number as inventory retrieved.

The transaction contents checking apparatus 14 reads the transaction contents checking rule base 15 to judge whether the business contents of the transaction can be processed outside the organization and whether the the contents are proper to the outside of the organization. If there are no problems, it sends the transaction to the transaction-to-mail converting apparatus 16 with the same through number as sent from the complex communication controller 11.

The transaction-to-mail converting apparatus 16 converts the transaction contents and through number to a mail message, determines a mail address for a specific business with reference to the electronic directory 17, and sends it to the complex communication controller 11.

The complex communication controller 11 sends the mail and the address to the communication controller 18. The communication controller 18 stores the mail through number into the unreturned mail memory 19 and after this, sends it to the the other party's system 4 to which the mail is addressed. At the same time, the complex communication controller 11 checks whether the through number exists in the complex communication file 63. If so, it converts a mail send time and a send name to mail using the transaction-to-mail converting apparatus 16, and sends the mail to the supervisory mail box 32 with the same through number as stored.

On the other land, the communication controller 18, when receiving a mail from the other party's system 4 outside the organization, reads the unreturned mail memory 19, and checks whether the mail is an answer to the preceding mail. If so, it sends the mail to the complex communication controller 11. The complex communication controller 11 sends it to the mail classifier 22.

The mail classifier 22 reads the mail judgment condition storage apparatus 20, and judges depending on contents of the mail whether the mail should be processed. If it should be processed, the selection and judgment apparatus 25 reads the supervisor selection condition in the mail judgment condition storage apparatus 20 to determine a process method. If it should be sent to the supervisor, the selection and judgment apparatus 25 sends it to the mail searcher 24.

The mail searcher 24 sends the mail to the supervisory mail box 32 of the supervisory work station 31 with a judging condition given to the mail contents.

For a transaction process, the mail is sent to the mail-to-transaction converting apparatus 21. The mail-to-transaction converting apparatus 21 converts the mail contents to transaction process message. The transaction process is sent to the staff system 2 under control of the complex communication controller 11.

Figure 9:
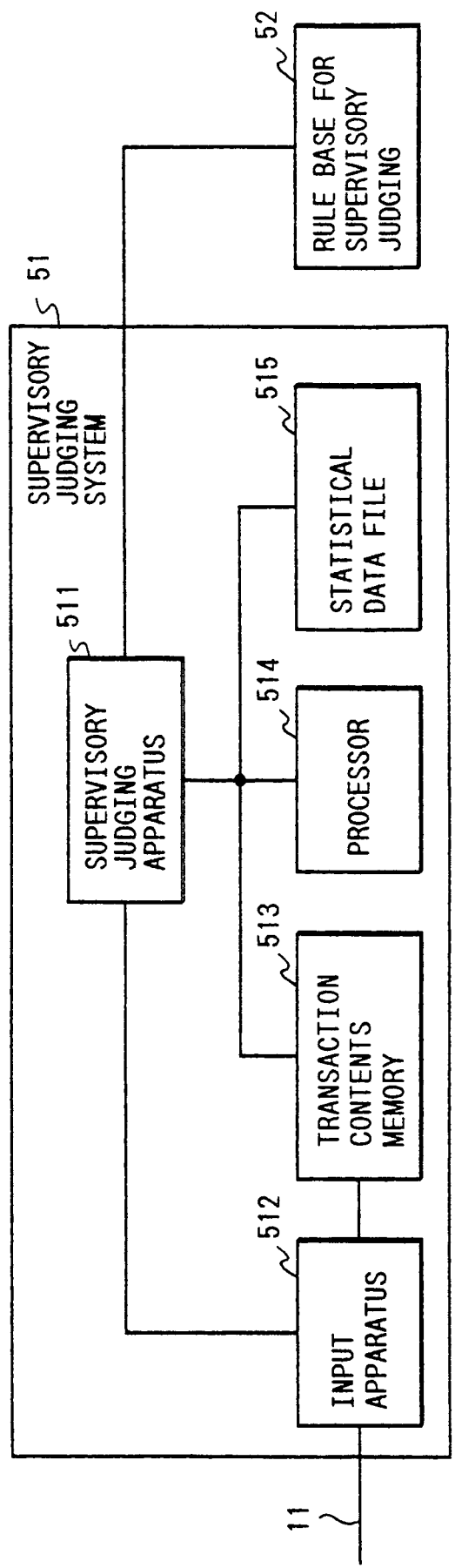
FIG. 9 is a block diagram illustrating an embodiment of the supervisory judging system 51 shown in FIG. 8.
Figure 10:
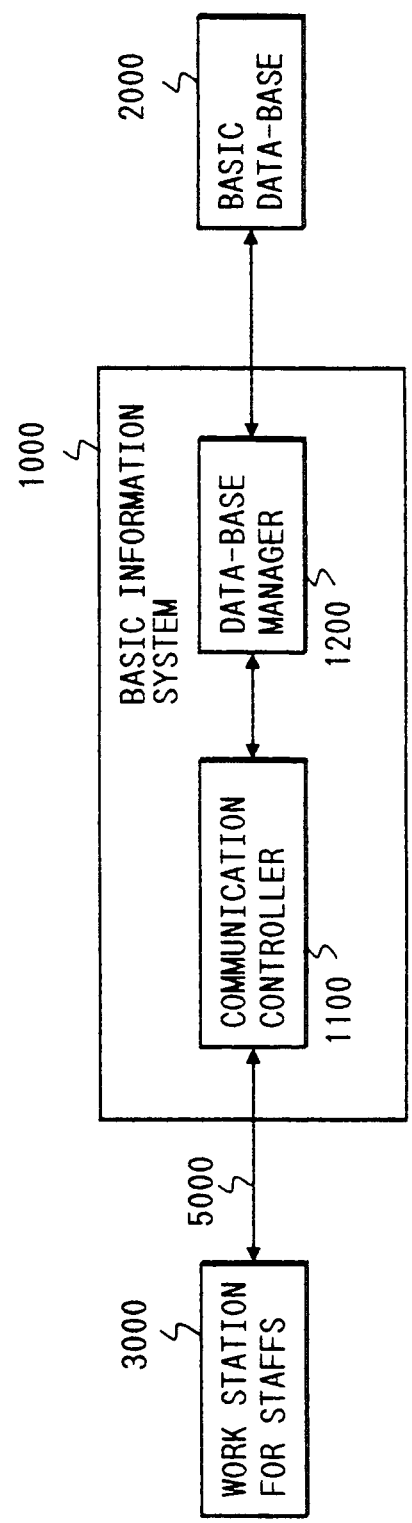
FIG. 10 shows a block diagram for a business monitoring and supporting system configured on the basis of the usual data base.

FIG. 9 is a block diagram illustrating an embodiment of the supervisory judging system 51 shown in FIG. 8. The supervisory judging system 51 comprises a supervisory judging apparatus 511 for judging contents of a transaction, an input apparatus 512 for receiving data from the complex communication controller 11, a transaction contents memory 513 for storing the transaction contents and the through number, and a processor 514 and a statistical data file 515 for obtaining a judged quantity described in a rule in the supervisory judging rule base 52.

The input apparatus 512 can receive the transaction contents and its through number signal from the complex communication controller 11. The input apparatus 512 then stores the contents and the through number into transaction contents memory 513 and at the same time, sends a signal to the supervisory judging apparatus 511.

The supervisory judging apparatus 511, when receiving the signal, reads the supervisory judging rule base 52 and obtains the judged quantity described in the rule in the supervisory judging rule base 52 using the statistical data file 515 and the processor 514. The supervisory judging apparatus 511 determines whether the transaction contents conforms to the rule and sends the judged result to the complex communication controller 11 with it having the through number of the transaction.

As described so far, the third embodiment can make it possible that the flow of business processes can be corrected on the basis of a decision by an executive. For example, delivery dates for important customers can be made earlier, resulting in increased efficiency of the whole business.

The conventional way of negotiations by telephone can be replaced by transmission of transaction contents by mail. This will not cause the other party to interrupt his business process. In other words, the other party can do the process at any time of his convenience.

In any of the three embodiments described above, the business monitoring system having the condition judgment apparatus and the transaction-to-mail converting apparatus in the basic configuration is provided in time basic information system. It, however, may be provided independently of the basic information system.

Thus, according to the embodiments, the supervisor can register report items he wants from the staff, and can change the report items. If the contents of business processes being made by the staff are the ones registered by the supervisor, they can be automatically sent to the mail box for the supervisory work station. This allows the supervisor to extract from an enormous flow of information only the one that conforms to the problem of concern to decide, resulting in shortened information retrieval time.

It should be noticed that if the supervisor determines the items to be reported once, mail is to be used as the communication method in view of the fact that checking whether the staff's business process conforms to them is a formal process and that the supervisor can check them at any time of his convenience.

It is possible to collect exact information efficiently according to the present invention.

WHAT IS CLAIMED IS:

1. A business monitoring computer system in a business processing system, comprising:
   a basic information system having at least judgment conditions storage means and communication control means;
   a staff work station;
   a supervisor work station,
   a first communication path connecting said basic information system through said communication control means to said staff work station;
   a second communication path connecting said basic information system through said communication control means to said supervisor work station;
   means for sending a business process request in the form of a transaction from the staff work station to the basic information system;
   means in said basic information system for processing the transaction;
   means for sending to said staff work station a result of the transaction processing performed by said processing means, independent of operation of said supervisor work station;

said judgment conditions storage means having conditions stored therein for judging contents of said transaction and extracting means for extracting a selected transaction having contents to be processed, based upon the conditions in the judgment conditions storage means; and, means for selectively acquiring, by said supervisor work station, the extracted selected transaction.

2. A business monitoring computer system according to claim 1 further comprising:

transaction-to-mail converting means for converting the extracted transaction to an electronic mail format and for sending it as electronic mail;

said supervisor work station having a mail storage means for storing the electronic mail received through the second communication path; and, means for sending to the supervisor work station the electronic mail converted by the transaction-to-mail converting means.

3. A business monitoring computer system according to claim 2, wherein the extracting means and the transaction-to-mail converting means include means for performing processes before the basic information system processes the business process request of the transaction.

4. A business monitoring computer system according to claim 3 further comprising means for preventing the basic information system from processing a transaction not satisfying at least one condition in said judgment conditions storage means.

5. A business monitoring computer system according to claim 3 further comprising:

mail judgment condition storage means having a condition stored therein as to whether an externally received electronic mail received through one of the communication paths contains desired contents to be processed;

received mail classifying means for classifying the externally received electronic mail based on a mail judgment condition stored in the mail judgment condition storage means; and, electronic mail storage means for storing said electronic mail classified by the received mail classifying means.

6. A business monitoring computer system according to claim 2 further comprising:

mail judgment condition storage means having a condition stored therein as to whether externally received electronic mail received through one of the communication paths contains desired contents to be processed;

received mail classifying means for classifying the externally received electronic mail based on a mail judgment condition stored in said mail judgment condition storage means; and, electronic mail storage means for storing said electronic mail classified by the received mail classifying means.

7. A business monitoring computer system according to claim 2 further comprising:

mail-to-transaction converting means for converting business process contents of the electronic mail to a transaction form before sending it.

8. A business monitoring computer system according to claim 7, wherein the mail-to-transaction converting means includes means for converting the contents of the electronic mail to a transaction before the basic information system performs a process of the transaction.

9. A business monitoring computer system according to claim 7, wherein the contents of the electronic mail further includes a judgment condition used for deciding to convert to said electronic mail which is converted through said transaction-to-mail converting means.

10. A business monitoring computer system according to claim 7 further comprising:

selection judgment means for judging whether to select either one of processing performed by said mail-to-transaction converting means or processing for storing the electronic mail as it is; and means for accomplishing said processing performed by said mail-to-transaction converting means when selected, and making the basic information system process the transaction.

11. A business monitoring computer system according to claim 7 further comprising:

selection judgment means for judging whether to select either one of processing performed by said mail-to-transaction converting means or processing for storing the electronic mail as it is; and, means for adding a judgment condition used by said selection judgment means for said electronic mail before sending the electronic mail to the supervisor work station.

12. A business monitoring computer system according to claim 6, wherein the basic information system further includes means for allowing the basic information system to return the results of the transaction processing to the staff work station and, in parallel, operating the extracting means and the transaction-to-mail converting means.

13. A business monitoring computer system according to claim 2, wherein the basic information system further includes means for allowing the basic information system to process the transaction sent from the staff work station and, in parallel, operating the extracting means and the transaction-to-mail converting means.

14. A business monitoring computer system in a business processing system, comprising:

a basic information system having at least judgment conditions storage means and communication control means;

a staff work station;

a supervisor work station;

a first communication path connecting said basic information system to said staff work station through said communication control means;

a second communication path connecting said basic information system to said supervisor work station through said communication control means;

means for sending a business process request in the form of a transaction from the staff work station to the basic information system;

means in said basic information system for processing the transaction;

means for sending to said staff work station, a result of the transaction processing performed by said processing means, independent of operation of said supervisor work station;

said judgment conditions storage means having stored therein conditions for judging contents of said transaction and extracting means for extracting a selected transaction having contents to be processed, based upon the conditions in the judgment conditions storage means; and, mailing means for converting a result of said extraction to an electronic mail format and for sending the result as electronic mail, to said supervisor work station.

15. A business monitoring and supporting computer system comprising:
a business monitoring system; and,
a processor system;
said business monitoring system further comprising:
a basic information system having at least communication control means;
a staff work station;
a supervisor work station;
a first communication path connecting said basic information system through said communication control means to said staff work station;
a second communication path connecting said basic information system through said communication control means to said supervisor work station;
means for sending a business process request in the form of a transaction from the staff work station to the basic information system;
means in said basic information system for processing the transaction; and
means for sending to said staff work station a result of the transaction processing performed by said processing means, independent of operation of said supervisor work station; and,
said processor system further comprising:
judgment conditions storage means having conditions stored therein for judging contents of said transaction,
extracting means for extracting a selected transaction having contents to be processed, based upon the conditions in the judgment conditions storage means; and,
said supervisor work station having means for selectively acquiring the extracted selected transaction.

16. A business monitoring and supporting computer system, comprising:
a business monitoring system; and,
a processor system;
said business monitoring system further comprising:
a basic information system;
a staff work station;
a supervisor work station;
a first communication path connecting said basic information system through said communication control means to said staff work station;
a second communication path connecting said basic information system through said communication control means to said supervisor work station;
means for sending a business process request in the form of a transaction from the staff work station to the basic information system;
means in said basic information system for processing the transaction; and
means for sending to said staff work station a result of the transaction processing performed by said processing means, independent of operation of said supervisor work station; and,
said processing system further comprising:
judgment conditions storage means having conditions stored therein for judging contents of said transaction,
extracting means for extracting a selected transaction having contents to be processed, based upon the conditions in the judgment conditions storage means; and,
mailing means for converting a result of said extraction to an electronic mail format and for sending the result as electronic mail, to said supervisor work station.

17. A business and supporting computer system according to claim 16 further comprising a mail storage means for storing mail received through the second communication path, in said supervisor work station.

18. A business monitoring method in a business processing computer system having a staff work station, a basic information system, a supervisor work station, a first communication path connecting said basic information system to said staff work station, and a second communication path connecting said basic information system to said supervisor work station, the method comprising:
a step of sending a business process request in the form of a transaction from the staff work station to the basic information system;
a step of processing the transaction in said basic information system;
a step of sending to said staff work station a result of the transaction processing performed by said processing step, independent of operation of said supervisor work station;
a step of extracting a selected transaction having contents to be processed, based upon conditions stored in a judgment conditions storage means; and,
a step of selectively acquiring, by said supervisor work station, the extracted selected transaction.

19. A business monitoring method according to claim 18, wherein the basic information system performs the step of extracting the transaction.

20. A business monitoring method according to claim 19 further comprising:
a step of sending said result of the transaction processing performed by said processing step to the supervisor work station instead of sending the result of the transaction processing to said staff work station,
in response to said business process request in an electronic mail format.

21. A business monitoring method in a business processing computer system having a staff work station, a basic information system, a supervisor work station, a first communication path connecting said basic information system to said staff work station, and a second communication path connecting said basic information system to said supervisor work station, the method comprising:
a step of sending a business process request in the form of a transaction from the staff work station to the basic information system;
a step of processing the transaction in said basic information system;
a step of sending to said staff work station a result of the transaction processing performed by said processing step, independent of operation of said supervisor work station;
a step of extracting a selected transaction having contents to be processed, on the basis of conditions in a judgment conditions storage means; and,
a step of converting the extracted selected transaction to an electronic mail format and for sending the result as an electronic mail, to said supervisor work station.

22. A business monitoring and supporting method according to claim 21, wherein the basic information system performs the step of extracting the transaction.

* * * * *

UNITED STATES PATENT AND TRADEMARK OFFICE
CERTIFICATE OF CORRECTION

PATENT NO. : 5,331,543
DATED : July 19, 1994
INVENTOR(S) : Hiroshi Yajima, et al.

It is certified that error appears in the above-indentified patent and that said Letters Patent is hereby corrected as shown below:

Claim 1, column 14, line 52, delete "," and substitute therefor --;--.

Claim 16, column 17, line 42, after "system" insert --having at least communication control means--.

Signed and Sealed this

Eleventh Day of October, 1994

Attest:

BRUCE LEHMAN

*Attesting Officer*     *Commissioner of Patents and Trademarks*